Nov. 24, 1936.　　　　D. DOMIZI　　　　2,061,899
PRIMARY ELECTRIC CELL
Filed Dec. 22, 1932
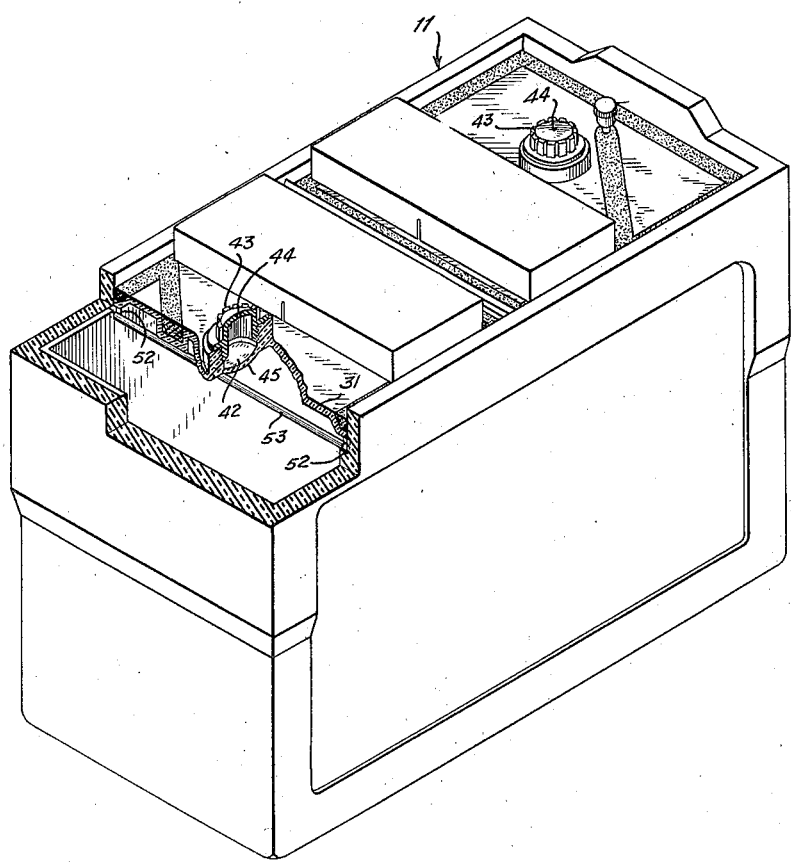
INVENTOR
DARIO DOMIZI
BY
ATTORNEY Patented Nov. 24, 1936

2,061,899

UNITED STATES PATENT OFFICE 2,061,899

PRIMARY ELECTRIC CELL

Dario Domizi, Lakewood, Ohio, assignor, by mesne assignments, to Union Carbide and Carbon Corporation, a corporation of New York Application December 22, 1932, Serial No. 648,334

3 Claims. (Cl. 136—182)

This invention relates to primary electric cells having liquid electrolyte and more specifically to means for indicating the proper height for the liquid electrolyte in such cells.

This and any other objects of my invention will be evident from the following specification and the accompanying illustration, in which the single figure is a perspective view of a battery with a portion broken away to show the structure of a cell embodying my invention.

This application is a continuation in part of my application Serial No. 508,788, filed January 14, 1931.

In cells of the type described herein it has been found advantageous to cast a block of electrolyte forming material, such as the monohydrate of caustic soda, about the electrodes. This forms a protection for the electrodes during shipment and has numerous other advantages. This material takes up water very readily and it is desirable that the battery should be sealed during shipment. At the same time it is desirable that the seal should be easily broken to permit the addition of water which dissolves the electrolyte forming material. To secure the desired result I provide a filling opening 42 on which is secured a cap 43; this cap having an opening 44 to permit the venting of the cell during use. While I may use a dummy cap without this opening during shipment I have found a satisfactory procedure to consist of forming a thin diaphragm 45 integral with the top. This diaphragm is relatively thin and can easily be broken away when it is desired to fill the cell for use. This diaphragm, being of the same material as the cell cover, is inert and the pieces may be allowed to fall into the cell. The electrolyte-forming material dissolves without evolution of great heat as would be the case if anhydrous caustic were used. Since the zinc electrodes should be completely covered by electrolyte at all times, and since the battery should not be so full of liquid that there is danger of spillage or overflow, it is desirable to provide means whereby the correct level of the electrolyte may be indicated.

As an example of such means I provide opposed recesses such as 52 in opposite inner walls of a casing 11 to support a horizontal wire or rod 53 of cylindrical metal or other suitable material directly below or adjacent and visible through the filling opening, such as that shown at 42, with the bottom thereof at the correct level for the electrolyte. Cell cover 31 closes the tops of recesses 52 and secures the indicator 53 rigidly therein.

I claim:—

1. In a primary cell having liquid electrolyte and a filling opening; a liquid level indicator comprising a horizontal rod below said opening, said rod extending between and being supported by opposite sides of said cell and being visible through said opening.

2. In a primary cell having liquid electrolyte and a filling opening; a liquid level indicator comprising a horizontal metal wire rigidly secured below said opening and extending across said opening substantially diametrically at the proper level for said electrolyte.

3. In a primary cell having a casing, liquid electrolyte in said casing, a cover for said casing, and a filling opening in said cover; a liquid level indicator comprising a horizontal rod below said opening; means for supporting said rod comprising opposed recesses in said casing, each provided with an open top, in which said indicator is disposed; and means comprising said cover for closing the top of each of said recesses and securing said indicator therein.

DARIO DOMIZI.